Jan. 1, 1974 SVEN-OLLE PAUL OLSSON 3,783,063
METHODS OF MANUFACTURING ENDLESS CONVEYOR BELTS
Filed April 15, 1971      2 Sheets-Sheet 1

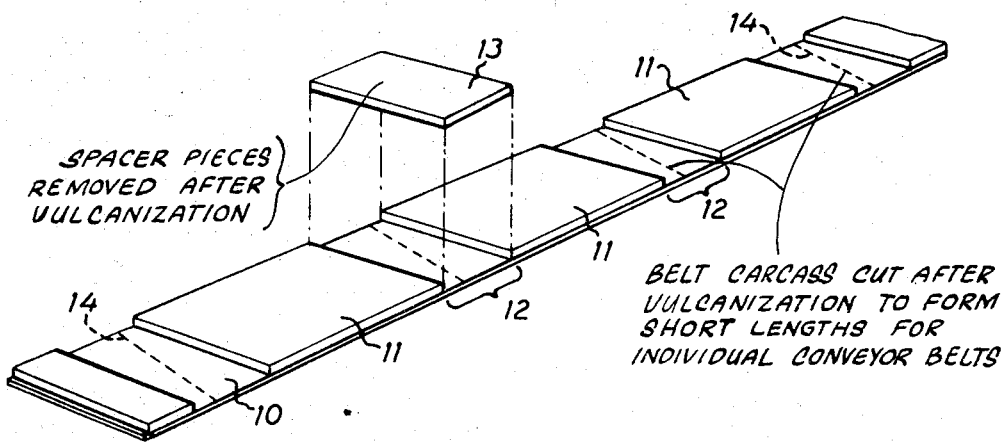

FIG. 1 — MANUFACTURING A CARCASS HAVING A LONGITUDINALLY REINFORCED PLY (10) AND TRANSVERSELY REINFORCED PLIES (11)

SPACER PIECES REMOVED AFTER VULCANIZATION

BELT CARCASS CUT AFTER VULCANIZATION TO FORM SHORT LENGTHS FOR INDIVIDUAL CONVEYOR BELTS

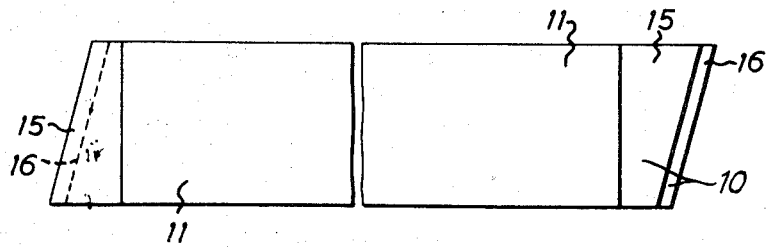

FIG. 3 — INDIVIDUAL SHORT CONVEYOR BELT LENGTH

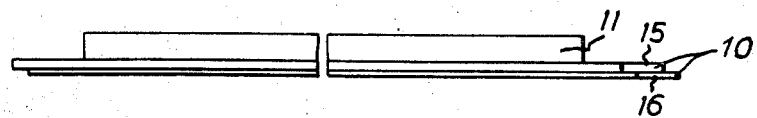

FIG. 4

INVENTOR:
SVEN-OLLE PAUL OLSSON
by Beveridge + DeGrandi
Attorneys

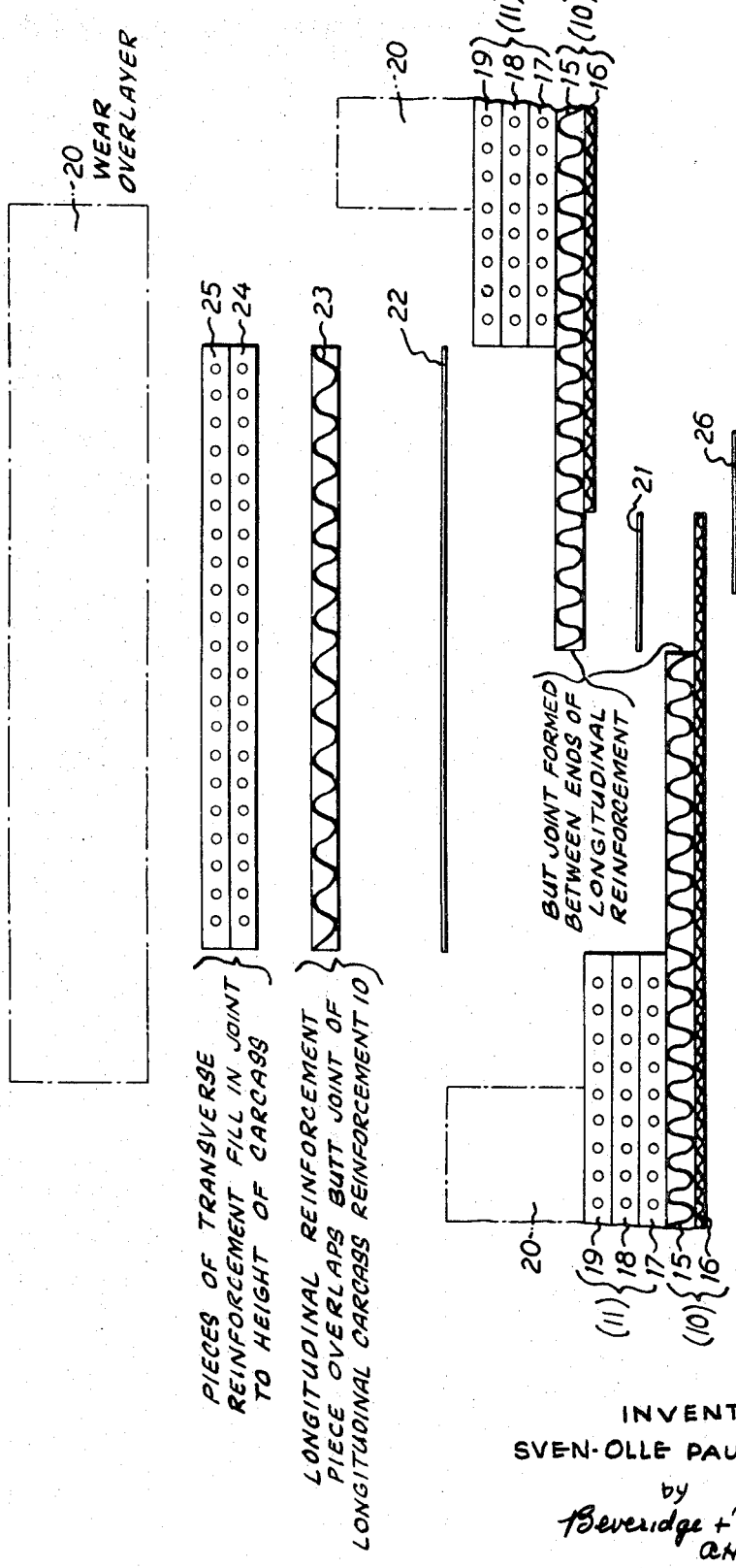

United States Patent Office 3,783,063
Patented Jan. 1, 1974

3,783,063
METHODS OF MANUFACTURING ENDLESS CONVEYOR BELTS
Sven-Olle Paul Olsson, Trelleborg, Sweden, assignor to Trelleborgs Gummifabriks Aktiebolag, Trelleborg, Sweden
Filed Apr. 15, 1971, Ser. No. 134,293
Claims priority, application Sweden, Apr. 16, 1970, 5,204/70
Int. Cl. B29h 7/22; F16g 1/26
U.S. Cl. 156—137                     3 Claims

ABSTRACT OF THE DISCLOSURE

Thick endless conveyor belts having a carcass with at least one longitudinally and several transversely tension-reinforcing plies are manufactured in long lengths and cut and spliced to short endless belts. A special carcass-building and splicing method is described. The longitudinal tension-reinforcement is made as a continuous length and the transverse tension-reinforcement is made as discontinuous lengths spaced apart along the longitudinal tension-reinforcement. Removable spacers are placed in the spaces during vulcanization. The carcass is cut off in the space between consecutive transverse tension-reinforcement lengths. In splicing a piece of longitudinally tension-reinforcing ply is placed in the space in overlapping relationship on the ends of the longitudinal tension-reinforcement forming a butt joint with each other. While omitting at least one transversely tension-reinforcing ply the remaining height portion of the space is filled out with transversely tension-reinforcing plies.

---

This invention relates to a method of manufacturing from an elastomer endless conveyor belts of a thickness which is large in relation to the intended radius of curvature of the belt around the drive and end pulleys thereof, in which long conveyor belt lengths are manufactured and cut into short separate belt lengths the ends of which are spliced to form endless conveyor belts having a carcass consisting of at least one longitudinally tension-reinforcing ply and several transversely tension-reinforcing plies and having a wear resistant cover fixed to the transversely tension-reinforcing plies of the carcass.

Usually the manufacture of conveyor belts is performed either by direct manufacture of endless belts or by manufacture of long open conveyor belt lengths which are then cut and joined or spliced to endless belts.

The direct manufacture of endless belts is a relatively expensive method which is mostly utilized only for the manufacture of very short conveyor belts particularly if these belts shall have a thickness which is large as compared to their contemplated radius of curvature around drive and end pulleys, as is the case for instance with feed belts for joinery and like machines. The reason why the last mentioned type of conveyor belts is manufactured directly in the form of endless belts is that joining or splicing of belt lengths often leads to difficulties and imparts to the belt a greater rigidity within the range of the joints or splices so that one is forced to use drive and end pulleys of larger diameter than what is necessary for the non-spliced portions of the conveyor belts. Another disadvantage of the direct manufacture of short endless conveyor belts is that such a manufacture is relatively expensive.

One object of the present invention is to provide a cheaper and more rational manufacture of endless conveyor belts of a thickness which is considerable compared to the contemplated radius of curvature of the belt around the drive and end pulleys.

According to the present invention this object is attained by a specific method of manufacturing long conveyor belt lengths and then cutting these long belt lengths into short separate belt lengths and joining or splicing the ends of these short belt lengths to obtain endless conveyor belts having a carcass consisting of at least one longitudinally tension-reinforcing ply and several transversely tension-reinforcing plies and having a wear resistant cover fixed to the transversely tension-reinforcing plies of the carcass. The method of the present invention is characterized in that in the manufacture of the carcass of the long conveyor belt lengths the longitudinally tension-reinforcing ply or plies are made in continuous lengths while the transversely tension-reinforcing plies are made in discontinuous lengths and spaced apart along the longitudinally tension-reinforcing ply or plies, each space between the individual lengths of the transversely tension-reinforcing plies corresponding to a splicing or joining area when the ends of the short belts lengths are spliced or joined together to form endless belts, that the longitudinally tension-reinforcing ply or plies and the transversely tension-reinforcing plies are vulcanized with spacer pieces placed in said spaces, which spacer pieces are removed after the vulcanization, that upon splicing or joining the short conveyor belt lengths formed by cutting the long conveyor belt lengths and intended for individual endless belts a butt joint is formed between the ends of the longitudinally tension-reinforcing ply or plies and a piece of a tension-reinforcement ply which with regard to strength substantially corresponds to the longitudinal tension-reinforcement of the remaining part of the belt is placed in each of the spaces between the ends of the transversely tension-reinforcing plies and that, while omitting at least one transversely tension-reinforcing ply, such a number of transversely tension-reinforcing ply pieces are inserted on top of each other in each of said spaces that the conveyor belt carcass will have a substantially uniform thickness within all parts of the composite conveyor belt. In severing the individual conveyor belt lengths the preferred procedure is to cut the longitudinally tension-reinforcing ply or plies obliquely across the conveyor belt.

The invention will be described more in detail hereinbelow with reference to the accompanying drawings in which:

FIG. 1 is a perspective view illustrating the structure of the conveyor belt carcass which includes several short belt lengths used for forming individual conveyor belts, at the manufacture and vulcanization of the reinforcing plies;

FIG. 2 is a longitudinal section, on a larger scale, of an individual conveyor belt length cut from the carcass of FIG. 1, schematically illustrating the joining of two conveyor belt length ends; and FIGS. 3 and 4 are a plan view and a side view, respectively, illustrating how the severing of one individual conveyor belt length is made and how this short belt length may be prepared for splicing or joining.

FIG. 1 shows how the carcass of a long conveyor belt length comprising several short conveyor belt lengths is built up by a continuous longitudinally tension-reinforcing ply 10 and a discontinuous transversely tension-reinforcing ply 11. The individual pieces of the discontinuous transverse reinforcing ply 11 are arranged at a certain distance (spaces 12) from each other along the longitudinal reinforcing ply 10. At the vulcanization of the conveyor belt carcass spacer pieces 13 are placed in the spaces 12 to fill them out. These spacer pieces 13 are removed after vulcanization which can be effected either in a vulcanization press or in a continuous vulcanization machine. The spacer pieces 13 may be rubber panels or belt lengths, suitable measures being taken, for instance release agents or foils are interposed, to prevent the spacer pieces and the conveyor belt carcass from being vulcanized together. The spaces 12 between the individual lengths of the transversely tension-reinforcing ply 11 substantially correspond to a splicing area at the splicing of individual short conveyor belt lengths, after the long conveyor belt length has been cut for instance along lines 14 in FIG. 1.

FIG. 2 shows by way of example one possible design of conveyor belt which can be manufactured in accordance with the method of the present invention. The longitudinal tension-reinforcement 10 in this example comprises an inner fabric ply 15 which may be for instance a polyethylene, polypropylene, polyester or polyamide cord fabric, and an outer fabric ply 16 which may be for instance an uncoated rayon fabric but which may also be a non-woven fabric. This outer fabric ply certainly takes up tensile stresses, but has as its main purpose to form a friction surface at the underside or bottom of the conveyor belt. In this case the transverse tension-reinforcement 11 is composed of three plies 17–19 which may be cord fabric plies, the cord yarns of which are preferably directed straight across but could also be directed obliquely across the conveyor belt. In conventional manner, a wear resistant cover 20 is secured on top of the conveyor belt carcass 15–19 and the upper surface of said cover 20 is designed in accordance with the contemplated use of the conveyor belt. For feed belts said wear resistant cover can be formed with a surface pattern e.g. transverse ridges alternating with transverse valleys. This wear resistant cover may be joined with the conveyor belt carcass at the vulcanization thereof but it may be of advantage to join it, e.g. by means of an adhesive or glue, with the already vulcanized conveyor belt carcass.

According to the invention, the ends of the short conveyor belt length shall be joined to form an endless belt by forming between the ends of the longitudinally tension-reinforcing ply or plies a butt joint so that the ends of the ply or plies are in end-to-end engagement. A piece of a longitudinally tension-reinforcing ply which with regard to tensile strength substantially corresponds to the longitudinal tension-reinforcement of the remaining part of the belt is then placed in the space between the transversely tension-reinforcing ply ends. On top of said piece of tension-reinforcing ply such a number of transversely tension-reinforcing ply pieces are placed upon each other that the conveyor belt carcass will have substantially uniform thickness within all portions of the composite conveyor belt. As will appear from FIG. 2 the inner fabric ply 15 and outer fabric ply 16 are thus cut in such a way as to provide an overlap joint. When the belt ends are joined, a thin rubber interlayer 21 can be placed in well known manner in the overlap joint. A rubber interlayer 22 is then placed on top of the inner fabric ply 15 between the ends of the transversely reinforcing plies 17–19, and on top of said rubber interlayer 22 there is placed a tension reinforcing ply piece 23 the strength of which should largely correspond to the combined strength of the tension reinforcing ply 15 and the outer fabric 16. Finally, two transversely reinforcing ply pieces 24 and 25 are placed on top of the longitudinally tension-reinforcing ply piece 23 so that the conveyor belt carcass will be of substantially uniform thickness within all portions of the composite conveyor belt. A portion of the wear resistant cover 20 of the conveyor belt is then applied on to the joining area of the carcass. Finally, it is possible in a known manner to apply a thin rubber cover strip on the outer side of the outer fabric 16 so that the butt joint therein is covered by this strip.

FIGS. 3 and 4 show a suitable way of cutting the long conveyor belt length into several short individual lengths and of preparing the tension-reinforcing plies of the conveyor belt carcass for the splicing operation. Thus, the long conveyor belt lengths are severed obliquely to the longitudinal direction of the belt and the splicing operation is prepared in that the plies 15, 16 are cut off in staggered relation to each other. In this case it is necessary to make the splicing areas 12 in FIG. 1 somewhat longer than the future joint or splice so that there is room for providing the overlap joint or splice between the two fabric plies 15 and 16.

The method according to the present invention provides the very considerable advantage that the conveyor belt within all portions of its longitudinal extension has an equally strong longitudinal tension-reinforcement, that is to say in no transverse section of the joint or splice there is a number of longitudinaly tension-reinforcing plies 15, 23 lower than the conveyor belt portions devoid of joints or splices. As already mentioned, the fabric ply 16 has the principal task of functioning as a friction producing outer layer even though this fabric ply of course contributes to providing the longitudinal tension-reinforcement of the conveyor belt. To obtain exactly the same strength within all portions of the carcass the longitudinally tension-reinforcing ply piece 23 may, however, be formed by a stronger fabric material the tensile strength of which corresponds to the total tensile strength of the fabric layers 15, 16. The same method can be employed when use is made of a greater number of longitudinally tension-reinforcing plies in the conveyor belt carcass.

What I claim and desire to secure by Letters Patent is:

1. In a method of manufacturing from an elastomer endless conveyor belts of a thickness which is large in relation to the intended radius of curvature of the belt around the drive and end pulleys thereof, in which long conveyor belt lengths are manufactured and cut into short separate belt lengths the ends of which are spliced to form endless conveyor belts having at least one longitudinally tension-reinforcing ply and several transversely tension-reinforcing plies and having a wear resistant cover fixed to the transversely tension-reinforcing plies of the belt carcass, the steps of (a) manufacturing the carcass of the long conveyor belt lengths from a continuous longitudinal tension-reinforcement consisting of at least one ply, and a discontinuous multi-ply transverse tension-reinforcement consisting of separate lengths of the multi-ply transverse tension-reinforcement;

(b) placing the separate lengths of the multi-ply transverse tension-reinforcement at a distance from each other along the continuous longitudial tension-reinforcement;

(c) filling out the spaces between consecutive lengths of the multi-ply transverse tension-reinforcement with removable spacers during vulcaization of the long conveyor belt lengths and removing said spacers after the vulcanization to leave spaces between consecutive lengths of the multi-ply transverse tension-reinforcement;

(d) dividing the carcass of the long conveyor belt lengths into a plurality of short separate belt lengths by cutting the long conveyor belt lengths in the spaces between consecutive lengths of the multi-ply transverse tension-reinforcement;

(e) forming an individual continuous conveyor belt by splicing together the opposite ends of a short separate belt length by (1) forming a butt joint between the ends of the longitudinal tension-reinforcement, (2) placing a piece of logitudinally tension reinforcing ply in the joint area in overlapping relationship on the ends of the longitudinal tension-reinforcement, (3) filling out the remaining carcass height portion of the joint area by placing transversely tension-reinforcing ply pieces on top of each other while omitting at least one of the transversely tension reinforcing plies of the multi-ply transverse tension-reinforcement.

2. In the method of claim 1 the step of cutting off the carcass of the long conveyor belt lengths obliquely across the belt in the spaces between consecutive lengths of the multi-ply transverse tension-reinforcement.

3. The method of claim 1 wherein the longitudinally tension-reinforcement contains longitudinal parallel cords.

References Cited
UNITED STATES PATENTS

| | | | |
|---|---|---|---|
| 1,920,525 | 8/1933 | Roderwald | 74—231 R |
| 2,955,065 | 10/1960 | Paul | 156—258 X |

FOREIGN PATENTS

| | | | |
|---|---|---|---|
| 1,048,783 | 11/1966 | Great Britain | 156—157 |

ALFRED L. LEAVITT, Primary Examiner

C. B. COSBY, Assistant Examiner

U.S. Cl. X.R.

74—232; 156—157, 258, 304